United States Patent [19]
Asta

[11] Patent Number: 5,401,922
[45] Date of Patent: Mar. 28, 1995

[54] MEMBRANE SWITCH
[75] Inventor: Joseph L. Asta, Des Plaines, Ill.
[73] Assignee: Illinois Tool Works Inc., Glenview, Ill.
[21] Appl. No.: 231,868
[22] Filed: Apr. 25, 1994

Related U.S. Application Data

[63] Continuation of Ser. No. 21,279, Feb. 22, 1993, abandoned.
[51] Int. Cl.6 .............................................. H01H 9/00
[52] U.S. Cl. .................... 200/5 A; 200/86 R; 200/512
[58] Field of Search ............ 200/5 R, 5 A, 61.54, 200/61.55, 85, 86 R, 511, 512, 306; 280/728, 731

[56] References Cited

U.S. PATENT DOCUMENTS

| | | | |
|---|---|---|---|
| 3,617,660 | 11/1971 | Krakinowski | 200/1 R |
| 4,034,176 | 7/1977 | Larson | 200/159 B |
| 4,046,975 | 9/1977 | Seeger, Jr. | 200/5 A |
| 4,243,852 | 1/1981 | Larson | 200/5 A |
| 4,382,165 | 5/1983 | Balash et al. | 200/5 A |
| 4,525,606 | 6/1985 | Sado | 200/5 A |
| 4,602,135 | 7/1986 | Phalen | 200/5 A |
| 5,198,629 | 3/1993 | Hayashi et al. | 200/61.54 |

Primary Examiner—A. D. Pellinen
Assistant Examiner—Michael A. Friedhofer
Attorney, Agent, or Firm—Schwartz & Weinrieb

[57] ABSTRACT

A membrane switch including first and second substantially flexible electrical contacts and a first layer of dielectric material deposited between and on one surface of one of the first and second contacts, the first layer being deposited in a predetermined geometric pattern including a plurality of cells defined by cell walls, the cell walls being broken in predetermined positions about the perimeter of each cell so that during and after actuation of the switch, air within a cell between the first and second contacts can vent to one or more adjoining cells to enable activation and prevent a vacuum from forming between the first and second contacts thereby enabling the switch to break contact after being released.

13 Claims, 4 Drawing Sheets

MEMBRANE SWITCH

This application is a continuation of application Ser. No. 08/021,279, filed Feb. 22, 1993, now abandoned.

BACKGROUND OF THE INVENTION

1. Field of the Invention

This invention relates generally to membrane switches, and more particularly to a membrane switch which provides an actuation force which can be varied, prevents a vacuum from forming between the switch layers, does not require a hard mounting surface for actuation and can be utilized in an air bag assembly for an automobile.

2. Description of the Related Art

Membrane switches typically include two opposing surfaces, each of which include circuits thereon which, when engaged, complete the desired electrical circuit. To maintain the two opposing surfaces apart and the circuit in an open state, some type of insulating layer or spacer is disposed between the two substrates.

An example of such a membrane switch is illustrated in U.S. Pat. No. 4,382,165 which discloses two circuit sheets, one of which is adhered to a backer or stiffener board. Each sheet includes circuit patterns on opposing surfaces including circuit paths and circular contact pads thereon. An extremely thin nonconductive adhesive layer is applied between the circuit patterns which covers the circuit paths but includes apertures at the position of each circular contact pad. In order to prevent unintentional short circuiting from tolerance variations or sagging of the circuit sheets, a discontinuous layer of adhesive in the form of lines or dots is applied in the apertured areas.

Such a switch, however, must be utilized with a backer board and cannot provide variable actuation forces since wide spacing between the lines or dots causes sagging while small spacing can prevent ready actuation of the switch. Additionally, since the adhesive provides a seal about the apertured areas, a vacuum can be created when the switch is depressed preventing release of the contacts.

Another membrane switch is illustrated in U.S. Pat. No. 4,602,135 which discloses two sheets having opposing surfaces where one surface includes switch leads and the other surface includes circuit completing material. A nonconductive spacer is positioned between the switch leads and the circuit completing material where the spacer is formed as a grid made up of squares.

As with the above described patent, a vacuum is frequently created between the layers of the switch when depressed which prevents release and breaking of the circuit. Additionally, such a switch also requires a stiff backing or mounting surface to enable activation.

It therefore would be desireable to provide a membrane switch having an activation force that can be varied across the surface of the switch, or from one application to another, which prevents a vacuum from forming between the switch layers, does not require a hard mounting surface for activation, and can be utilized in an automotive air bag assembly without injuring the user or damaging the air bag before or during deployment.

SUMMARY OF THE INVENTION

The invention provides a membrane switch having first and second substantially flexible electrical contacts and a layer of dielectric material deposited between, and on one surface of, one of the first and second contacts. The first layer of dielectric material is deposited in a predetermined geometric pattern including a plurality of cells defined by cell walls. The cell walls are broken in predetermined positions about the perimeter of each cell so that, during and after actuation of the switch, air within any cell can vent to one or more adjoining cells. This venting enables activation and prevents a vacuum from forming between the first and second contacts thereby enabling the switch to break contact after being depressed.

Various other objects, features, and attendant advantages of the present invention will become better understood from the following detailed description, when considered in connection with the accompanying drawings, in which like reference characters designate like or corresponding parts throughout the several views, and wherein:

DESCRIPTION OF THE PREFERRED EMBODIMENTS

Figure 1:
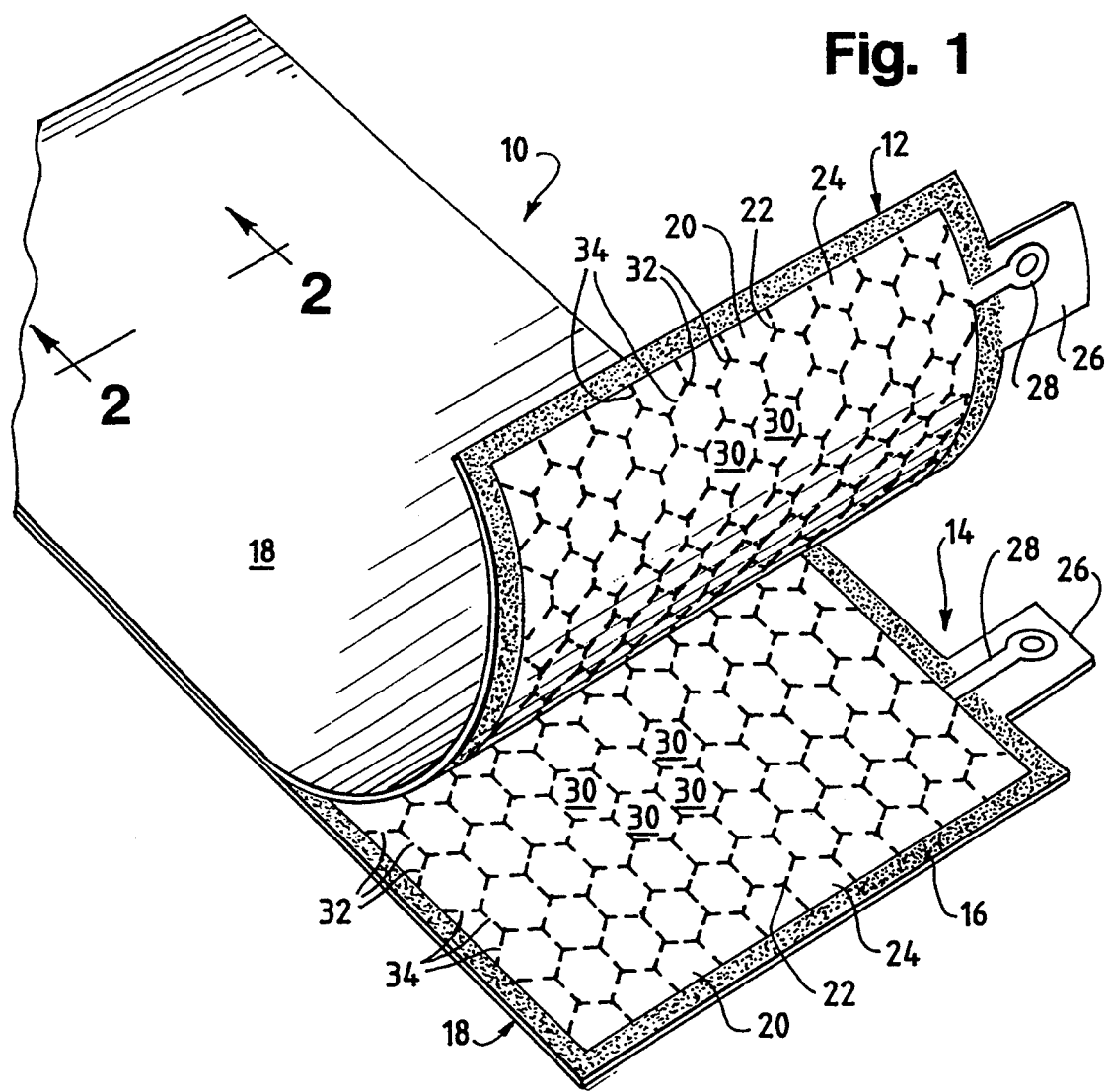
FIG. 1 is a perspective partially exploded view of the membrane switch of the invention illustrating the opposing flexible switch assemblies and the patterns of the dielectric spacer layers thereon.

Referring to FIG. 1, the membrane switch of the invention is generally is designated by the reference numeral 10. The switch 10 is composed of first and second switch assemblies 12 and 14 which are substantially mirror images of each other and are secured in face-to-face contact about their perimeters by an adhesive 16.

The switch 10 is substantially flexible and can be provided in any size and shape. The adhesive 16 provides a seal about the perimeter of the switch 10 to prevent infiltration of the elements between the two assemblies 12 and 14.

Figure 2:
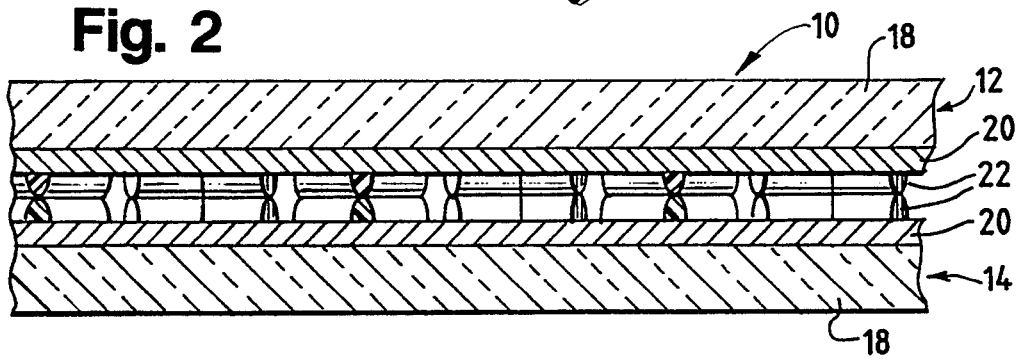
FIG. 2 is a cross-sectional view of the membrane switch of the invention taken along lines 2—2 of FIG. 1 and in the direction indicated generally.

As FIGS. 1 and 2 illustrate, each assembly 12 and 14 preferably includes three layers. The first layer is a flexible substrate 18, such as Ultem, Polyester or the like, and forms the outside surface of each assembly 12 and 14. The second layer is a conductive layer 20, such as a polymer like silver ink or similar conductive material. The third layer is a dielectric spacer layer 22 which is formed on top of the conductive layer 20 in a predetermined pattern which will be described in detail below. If desired, the dielectric layer 22 may only be included on one of the assemblies 12 or 14.

The second conductive layer 20 is deposited with a uniform thickness about an entire inside surface 24 of the flexible substrates 18, such as by deposition, silk screening or any similar process. To enable contact of the conductive layers 20 to the remainder of the electrical circuit, each flexible substrate 18 includes a tab 26 formed at a desired position about the perimeter of the substrate 18 where a contact portion or lead 28 of the conductive layer 20 is deposited.

Figure 8:
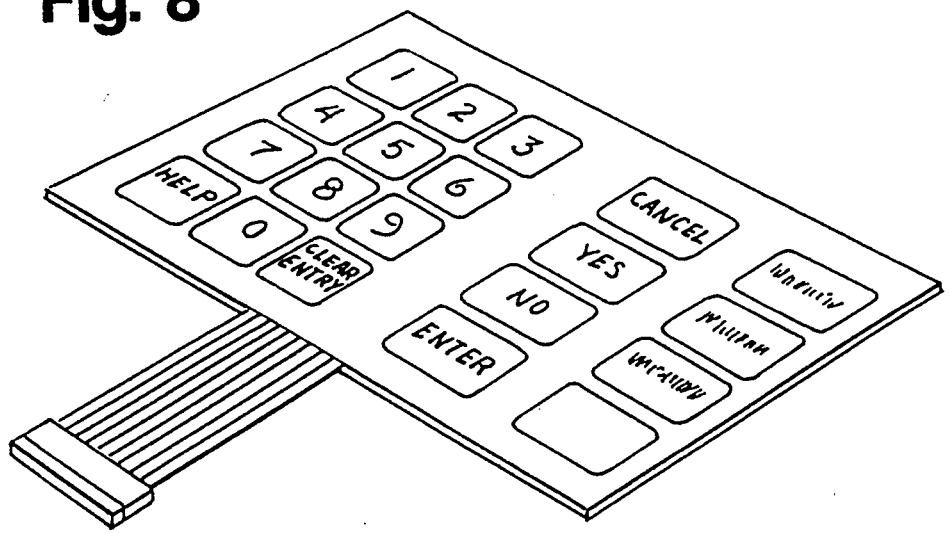
FIG. 8 is a perspective view of the membrane switch of the invention illustrated in conjunction with a control panel or keyboard.

Although the switch 10 is illustrated as containing only one individual switch mechanism or area, it is to be understood that the single switch 10 can be broken up into one or more individual switches having their own tabs and contact portions (not illustrated). Such a switch can readily can be utilized for a control panel or keyboard as illustrated, for example, in FIG. 8. Additionally, as described in detail below, the force required to activate the switch or switches can vary across the surface of the switch by varying the pattern of the dielectric spacer layers 20.

Figure 3:
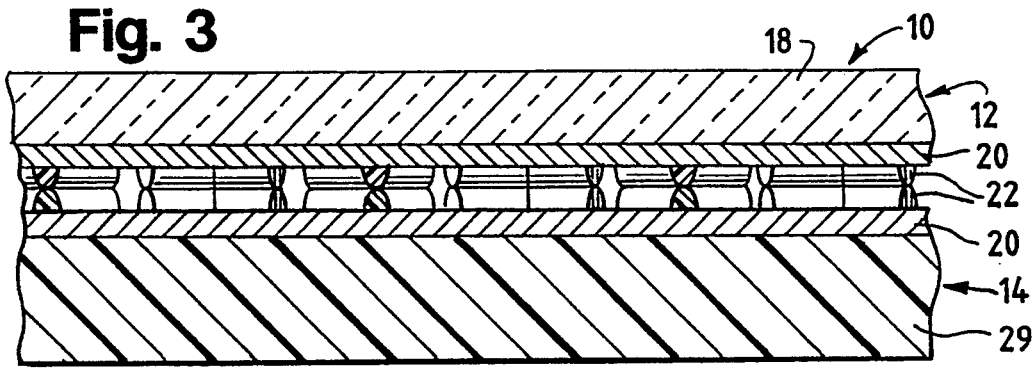
FIG. 3 is a cross-sectional view of the membrane switch of the invention, similar to FIG. 2, illustrating the switch in conjunction with a non-flexible substrate.

As FIG. 3 illustrates, if desired, the flexible substrate 18 of at least one assembly, such as the assembly 14, can be replaced with a stiff material, such as a circuit board 29. This provides a surface against which the switch 10 can be depressed by a user. It is to be noted, however, that due to the unique pattern of the dielectric spacer layers 22, such a stiff material is not necessary, especially with patterns requiring less actuation forces.

The dielectric spacer layer 22 is also deposited with a uniform thickness on top of the conductive layer 20 such as by deposition, silk screening or any similar process where the thickness can vary. Preferably, the predetermined pattern of the dielectric spacer layer 22 is in the form of a series of hexagons forming a plurality of substantially identical cells 30 across the surface of the conductive layer 20.

Each cell 30 is defined by six cell walls 32 which are shared with adjacent cells in the pattern. It has been found that the hexagonal pattern provides the most conductive surface areas with the least amount of dead space at the wall junctions, as is found if the pattern is in the form of rectangles, circles or similar patterns.

Each cell wall 32 is broken proximate its midpoint to provide channels 34 between adjacent cells 30. Such channels 34 enable air between the first and second assemblies 12 and 14 to move between one or more adjacent cells 30 when depressed to activate the switch 10.

Additionally, when the switch 10 is released, the channels 34 enable air to re-enter the depressed cell or cells 30. This design completely eliminates any vacuum from forming between the cells 30 and the switch assemblies 12 and 14 which, if present, would prevent the switch 10 from breaking contact after the user released the switch 10.

The channels 34 of each cell 30 preferably align with the channels 34 on the opposite side of the cells 30 so that three continuous sets of parallel lines or air channels are formed across the assemblies 12 and 14. These lines or air channels assist in the free flow of air between one or more cells 30 which in turn provides better actuation and release of the switch 10.

Figure 4:
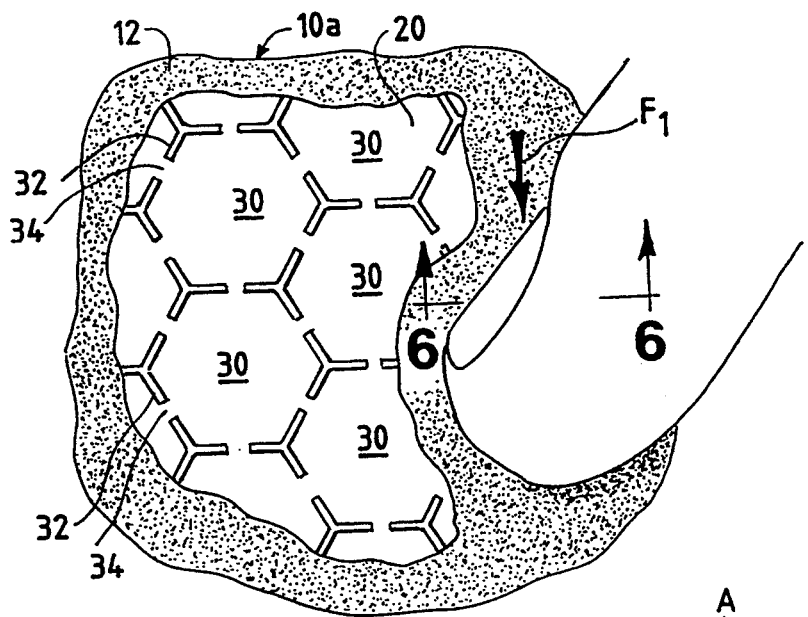
FIG. 4 is a top plan view of the membrane switch of the invention with a portion of the top flexible switch assembly broken away illustrating a low activation force pattern of the dielectric spacer layer of the invention.

In order to vary the force required to activate the switch 10, the size of the hexagons is adjusted. For example, FIG. 4 illustrates a switch 10a having enlarged hexagons which require an actuation force F1 which is rather weak while the hexagon pattern still prevents sagging within the cells 30.

Figure 5:
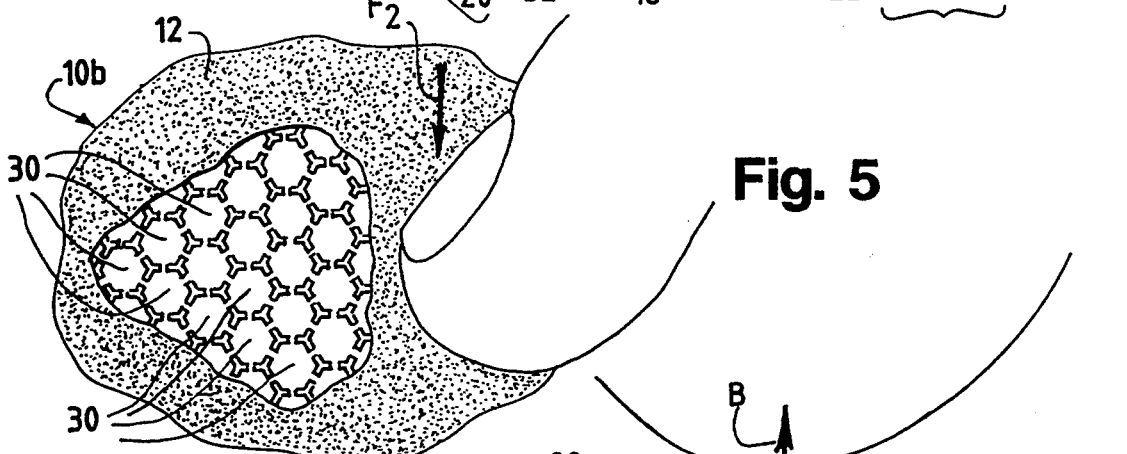
FIG. 5 is a top plan view of the membrane switch of the invention, similar to FIG. 4, illustrating a high activation force pattern of the dielectric spacer layer of the invention.

FIG. 5 illustrates a switch 10b having reduced hexagons which require an actuation force F2 which is stronger than force F1. Thus, the actuation force required can be adjusted to provide a variety of different switches, such as switches 10a or 10b, each of which have different actuation forces merely by changing the size of the hexagons.

Additionally, a switch 10 can be provided having two or more different size hexagonal patterns as well as one or more individual switch areas therein. If one switch area is to be provided, different size hexagonal patterns can be positioned about the surface of the switch 10 to change the actuation force required in different areas. If two or more switch areas are to be provided, the size of the hexagonal pattern can be varied to provide the different switch areas with a desired actuation force as well as providing different actuation forces across the surface of any individual switch area.

Figure 6:
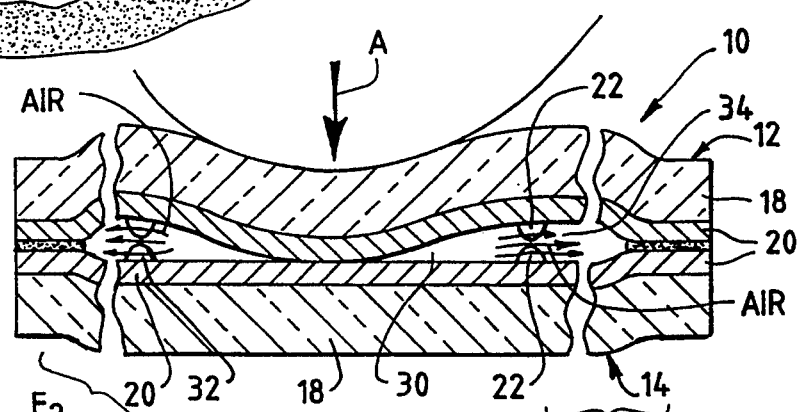
FIG. 6 is a cross-sectional view of the membrane switch of the invention taken along lines 6—6 of FIG. 4 and in the direction indicated generally, illustrating actuation of the switch by a user.
Figure 7:
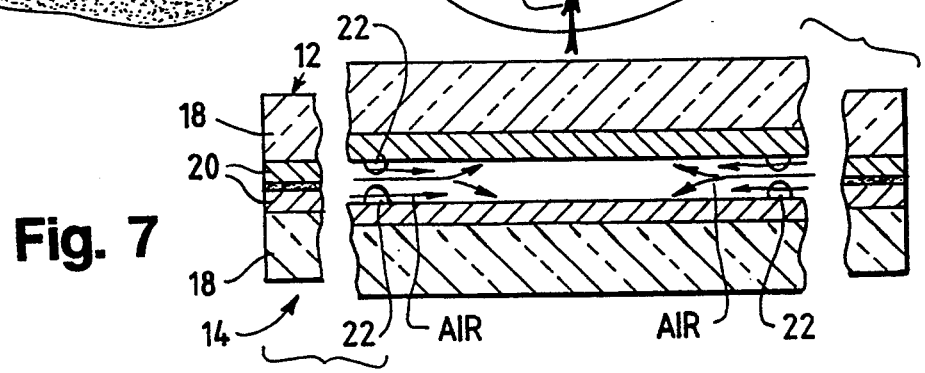
FIG. 7 is a cross-sectional view of the membrane switch of the invention, similar to FIG. 6, illustrating release of the switch.

FIGS. 6 and 7 illustrate the basic operation of the switch 10. In FIG. 6, a user contacts and depresses the flexible substrate 18 of the assembly 12, such as with a finger or other implement, in the direction of arrow "A". Upon being depressed, air is evacuated from one or more cells 30 through one or more channels 34 to one or more adjacent cells 30 and the two conductive layers 20 touch to complete the circuit and activate the switch.

As FIG. 7 illustrates, upon being released, the resiliency of the flexible substrates 18 and the dielectric spacer layers 22 force the assembly 12 upward in the direction of arrow "B". This enables air to de drawn back into the depressed cell or cells 30 to break contact with the two conductive layers 20 and provide an open circuit.

Figure 9:
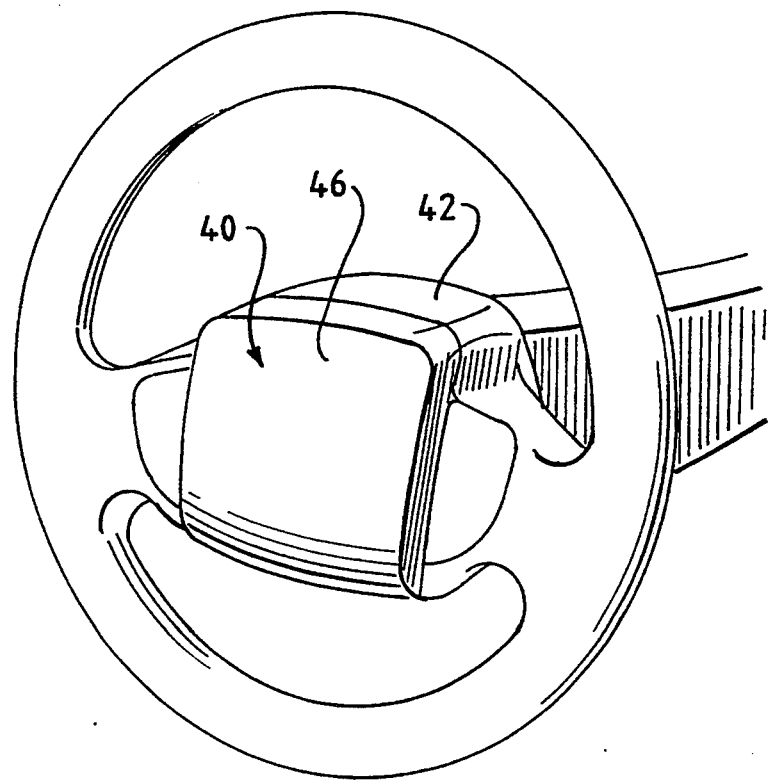
FIG. 9 is a perspective view of a steering wheel and air bag assembly having the membrane switch of the invention incorporated therein.
Figure 10:
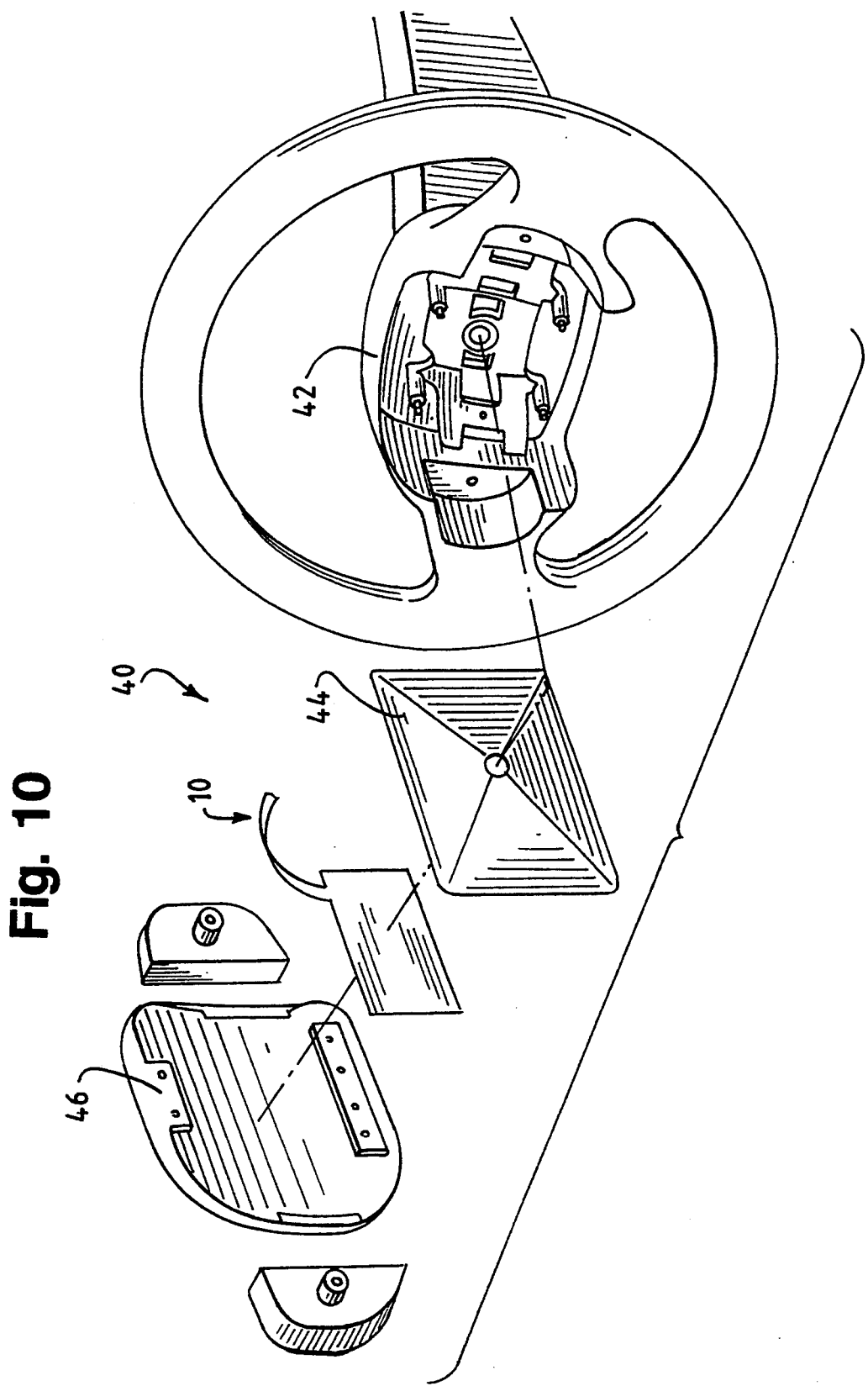
FIG. 10 is a perspective exploded view of the steering wheel and air bag assembly of FIG. 9.

FIG. 9 and 10 illustrate the switch 10 utilized with an air bag assembly 40 which is illustrated installed in a steering wheel housing 42. The air bag assembly 40 typically includes and air bag 44 and an outer cover, skin or containment member 46 which is utilized to contain the air bag 44 within the housing 42 until deployment is desired.

The switch 10 can be utilized in this type of environment preferably to provide a horn switch which is typically provided in the center of the steering wheel. Since the switch 10 does not require a backer board, the switch can be provided directly in contact with the air bag 44.

Due to the flexibility of the switch 10, depression of the switch 10 will not damage the air bag 44. Additionally, upon deployment of the air bag 44, the switch 10 merely bends out of the way without damaging the air bag 44 or causing injury to a user.

It is to be understood that the switch 10 can be utilized in any housing, not just a steering wheel housing 42, and provided with numerous individual switch areas to enable the user to activate a variety of functions.

Additionally, if desired, some type of backer board or substrate (not illustrated) can be utilized which can be hingedly mounted to the housing and would not cause damage to the air bag 44 or the user. Typically, such a backer board is not required unless large actuation forces are necessary.

Modifications and variations of the present invention are possible in light of the above teachings. It therefore is to be understood that within the scope of the appended claims, the invention may be practiced otherwise than as specifically described.

What is claimed and desired to be secured by letters patent is:

1. A membrane switch, comprising:
   first substantially flexible electrical contact means;
   second substantially flexible electrical contact means;
   a first layer of dielectric material disposed upon one surface of said first electrical contact means so as to be interposed between said first and second electrical contact means, said first layer of dielectric material comprising a plurality of contiguous cells arranged in a predetermined geometrical pattern; and
   a second layer of dielectric material disposed upon one surface of said second electrical contact means so as to be interposed between said first and second electrical contact means and in contact with said first layer of dielectric material disposed upon said one surface of said first electrical contact means, said second layer of dielectric material comprising a plurality of contiguous cells arranged in a predetermined geometrical pattern which is substantially identical to said geometrical pattern of said cells of said first layer of dielectric material such that said first and second electrical contact means, having said first and second layers of dielectric material disposed thereon, are effectively interchangeable,
   wherein each one of said cells of said first and second layers of dielectric material has the configuration of a polygon which is defined by means of a predetermined number of vertices, and a predetermined number of sides defining cell walls of said cells which are shared by adjoining cells, said cell walls of said first and second layers of dielectric material being broken in predetermined positions about the perimeter of each cell and being in alignment with respect to each other so that, during and after actuation of said switch, air within any one cell disposed within an actuated area of said switch and between said first and second electrical contact means can vent to one or more adjoining cells, and can receive air back from said one or more adjoining cells, so as to enable activation of said switch and prevent a vacuum from forming between said first and second electrical contact means thereby enabling said switch to break contact after being depressed and released.

2. The membrane switch as defined in claim 1 wherein said geometric pattern includes a series of hexagons defining a plurality of cells where each of the six sides of the hexagons are broken proximate a midpoint thereof.

3. The membrane switch as defined in claim 1 wherein said first and second contact means are provided by depositing a conductive layer of material on a respective first and second flexible substrate.

4. The membrane switch as defined in claim 1 wherein said first and second electrical contact means are secured about their perimeters with an adhesive to environmentally protect the switch contacts by preventing infiltration of the elements therebetween.

5. The membrane switch as defined in claim 1 wherein a resilient member is provided on an exterior surface of at least one of said first and second contact means to distribute both mechanical and electrical switch loads over more than one cell.

6. A membrane switch as set forth in claim 1, wherein:
   said cells have a predetermined size which determines the amount of force necessary to actuate said switch.

7. An air bag assembly, comprising:
   housing means having at least one opening defined therethrough;
   air bag means mounted within said housing means;
   an outer cover member enclosing said at least one opening defined within said housing means and securing said air bag means therein, said outer cover member being capable of enabling release of said air bag means through said at least one opening defined within said housing means and through said outer cover member when said air bag means is activated; and
   membrane switch means mounted between said air bag means and said outer cover member and which can be activated by a user through said outer cover member, and enable unimpeded deployment of said air bag means while preventing damage to said air bag means and injury to said user;
   said membrane switch means including first and second substantially flexible electrical contact means; a first layer of dielectric material disposed upon one surface of said first electrical contact means so as to be interposed between said first and second electrical contact means, said first layer of dielectric material comprising a plurality of contiguous cells arranged in a predetermined geometrical pattern; and a second layer of dielectric material disposed upon one surface of said second electrical contact means so as to be interposed between said first and second electrical contact means and in contact with said first layer of dielectric material disposed upon said one surface of said first electrical contact means, said second layer of dielectric material comprising a plurality of contiguous cells arranged in a predetermined geometrical pattern which is substantially identical to said geometrical pattern of said cells of said first layer of dielectric material such that said first and second electrical contact means, having said first and second layers of dielectric material disposed thereon, are effectively interchangeable; wherein each one of said cells of said first and second layers of dielectric material has the configuration of a polygon which is defined by means of a predetermined number of vertices, and a predetermined number of sides defining cell walls of said cells which are shared by adjoining cells, said cell walls of said first and second layers of dielectric material being broken in predetermined positions about the perimeter of each cell and being in alignment with respect to each other so that, during and after actuation of said switch, air within any one cell disposed within an actuated area of said switch and between said first and second electrical contact means can vent to one or more adjoining cells, and can receive air back from said one or more adjoining cells, so as to enable activation of said switch and prevent a vacuum from forming between said first and second electrical contact means thereby enabling said switch to break contact after being depressed and released.

8. The assembly as defined in claim 7 wherein said geometric pattern includes a series of hexagons defining a plurality of cells where each of the six sides of the hexagons are broken proximate a midpoint thereof.

9. The assembly as defined in claim 5 wherein said first and second electrical contact means are secured about their perimeters with an adhesive to environmentally protect the switch contacts by preventing infiltration of the elements therebetween.

10. The assembly as defined in claim 7 wherein said outer cover member is a resilient member which assists in distributing both mechanical and electrical switch loads over more than one cell.

11. An assembly as set forth in claim 7, wherein:
said cells have a predetermined size which determines the amount of force necessary to actuate said membrane switch means.

12. An assembly as set forth in claim 7, wherein:
said housing means comprises a steering wheel housing of a motor vehicle.

13. An assembly as set forth in claim 12, wherein:
said membrane switch means comprises a horn switch of said motor vehicle.

* * * * *